(12) United States Patent
Lee et al.

(10) Patent No.: US 7,777,838 B2
(45) Date of Patent: Aug. 17, 2010

(54) LIQUID CRYSTAL DISPLAY DEVICE AND FABRICATION METHOD THEREOF

(75) Inventors: Byung-Joo Lee, Gyeonggi-Do (KR); Sung-Min Jung, Incheon (KR); Ju-Un Park, Gyeonggi-Do (KR); Hyung-Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 246 days.

(21) Appl. No.: 11/819,941

(22) Filed: Jun. 29, 2007

(65) Prior Publication Data

US 2008/0002112 A1 Jan. 3, 2008

(30) Foreign Application Priority Data

Jun. 29, 2006 (KR) .................. 10-2006-0059974

(51) Int. Cl.
*G02F 1/1335* (2006.01)
*G02F 1/1333* (2006.01)
(52) U.S. Cl. .................. 349/106; 349/71; 349/96; 349/110
(58) Field of Classification Search ............ 349/106, 349/71
See application file for complete search history.

(56) References Cited

U.S. PATENT DOCUMENTS 6,295,106 B1 * 9/2001 Fukuzawa et al. ............. 349/71
6,429,916 B1 * 8/2002 Nakata et al. ............... 349/106

FOREIGN PATENT DOCUMENTS

JP      08-029787     2/1996
WO   WO 2004092808   10/2004

* cited by examiner

*Primary Examiner*—Uyen-Chau N Le
*Assistant Examiner*—Kajli Prince
(74) *Attorney, Agent, or Firm*—McKenna Long & Aldridge LLP

(57) ABSTRACT

A liquid crystal display (LCD) comprises: a first substrate and a second substrate; a liquid crystal layer between the first and the second substrates; and a fluorescent color filter responding to light over the first substrate, thereby the fluorescent color filter supplies the light to the liquid crystal layer. A method for fabricating a LCD includes: preparing first and second substrates; depositing fluorescent material over the first substrate to form a color filter, the fluorescent material emitting the visible light in responding to the ULTRAVIOLET rays; and forming a liquid crystal layer between the first and second substrates.

10 Claims, 3 Drawing Sheets

LIQUID CRYSTAL DISPLAY DEVICE AND FABRICATION METHOD THEREOF

This application claims the benefit of Korean Patent Application No. 2006-59974, filed on Jun. 29, 2006, which is hereby incorporated by reference for all purposes as if fully set forth herein.

BACKGROUND OF THE INVENTION

1. Field of the Invention

The present invention relates to a liquid crystal display (LCD) and, more particularly, to an LCD including a fluorescent color filter and an intra-cell polarizer formed on the fluorescent color filter, and a fabrication method thereof.

2. Discussion of the Related Art

Recently, as diverse portable electronic devices such as mobile phones, PDAs or notebook computers are being developed, a flat panel display (FPD) which is light, thin, short and small and can be applicable to the portable electronic devices is increasingly required. As the FPD, the LCD, a PDP (Plasma display panel), an FED (Field Emission Display), a VFD (Vacuum Fluorescent Display) and an OLED (Organic Light Emitting Device), etc. are actively studied, and among them, the LCD is receiving much attention because of its mass-production techniques, easiness of its driving unit and implementation of high picture quality.

FIG. 1 is an exploded perspective view of a general LCD according to the related art. As shown, the LCD includes a liquid crystal panel 10 and a backlight unit 20.

The liquid crystal panel 10 includes first and second substrates that face each other and a liquid crystal layer (not shown) formed between the two substrates.

Because the liquid crystal layer has an optical anisotropy, when an electrical signal is applied thereto, an alignment of liquid crystal molecules is controlled to display an image. Of the two substrates, thin film transistors TFTs are positioned on the first substrate and an image is displayed according to an ON/OFF of the TFTs.

The liquid crystal panel 10 is connected with a gate and source PCB (Printed Circuit Board, not shown) that applies an image signal and a scan signal to the liquid crystal panel 10.

Since the liquid crystal panel 10 cannot illuminate by itself, a light providing unit is required. So the liquid crystal panel 10 includes a backlight unit having a light source that provides light. The backlight unit 20 is divided into a direct type backlight unit and an edge type backlight unit depending on how a light source is disposed. The direct type backlight unit is applied for a relatively large LCD while the edge type backlight unit is applied for a relatively small LCD. The backlight unit used for the illustrated LCD in FIG. 1 is the edge type backlight unit.

In the LCD having the edge type backlight unit, a light source 21 that provides light is disposed on at least one lateral surface of the liquid crystal panel 10, and a light guide plate 24 that has at least one surface facing the light source 21 and guides light emitted from the light source 21 to the liquid crystal panel 10. Namely, the light source 21 is positioned in a lengthwise direction at the side of the light guide plate 24. Light emitted from the light source 21 is made incident to one side of the light guide plate 24, refracted and reflected in the light guide plate 24, and then outputted in a direction of the liquid crystal panel 10.

An optical films 23 such as a diffusion plate and/or a prism plate is stacked at an upper portion of the light guide plate 24 in order to diffuse the light made incident from the light source 21 to make it irradiated onto the liquid crystal panel 10. The optical films 23 serve to effectively diffuse and collect the light outputted from the light guide plate 24.

As the light source 21 of the backlight unit, a cold cathode fluorescent lamp (CCFL) is commonly used.

When current having high voltage flows to electrodes of both ends of the CCFL via an electric wire, electrons are emitted from the both ends of the electrode 56. The electrons make mercury(Hg) contained in the discharge gas be excited to a state of a high energy level.

Mercury in the excited state falls to a ground state, emitting ultraviolet rays. The ultraviolet rays change an energy level of fluorescent materials coated on an inner wall of a transparent tube. The fluorescent materials absorb these ultraviolet rays and finally emit white light of a visible ray region.

In order to implement an image by using liquid crystal, the light source 21 is required. However, a transmission light emitting from the light source 21 includes vibration vectors that are not required for the liquid crystal panel. So in order to control the vibration vectors of the transmission light, polarizers 15a and 15b are attached on both surfaces of the liquid crystal panel 10 such that the transmission axis of each polarizer cross at 90° with respect to each other.

The polarizers 15a and 15b polarize a transmission light which has passed through the liquid crystal layer into light with a particular vibration vector. Thus, while passing through the liquid crystal panel 10, intensity of the transmission light is controlled according to a rotation degree of a polarization axis, enabling expression of black to white. Such transmission light can appear images of various colors after passing through color filters.

FIG. 2 shows schematically a section of a general liquid crystal panel.

As shown, an LCD panel 10 includes a first substrate 5, a second substrate 3 and a liquid a crystal layer 7 formed between the first and second substrates 5 and 3. The first substrate 5 includes a TFT 9 formed thereon. Although not shown, a plurality of pixels are formed on the first substrate and each pixel includes the switching devices such as the TFTs 9.

The second substrate 3 includes color filter 2 for implementing colors, and is formed to face the first substrate 5 with the liquid crystal layer 7 interposed therebetween. A black matrix 8 for blocking light is formed on the second substrate 3.

In addition, a pixel electrode 6 and a common electrode 4 are formed on the first and second substrates 5 and 3, respectively, and an alignment layer (not shown) for aligning liquid crystal molecules of the liquid crystal layer 7 is coated on the substrates to determine orientation of the liquid crystal molecules.

In the liquid crystal panel 10, liquid crystal molecules are driven by the switching device formed as the TFT 9 on the first substrate 5 to control the intensity of light transmitting through the liquid crystal layer to thus display information.

In fabricating the first and second substrates, the first substrate 5 includes a process of forming the TFT 9 on the first substrate 5, and the second substrate 3 includes a process of forming the color filter 2.

The first substrate process includes forming a plurality of gate lines and a plurality of data lines that define pixel regions, and forming the TFTs 9 connected with the gate lines and the data lines. The pixel electrodes 6 are also formed to be connected with the TFTs 9 to drive the liquid crystal layer 7.

The second substrate process includes forming the black matrix 8 on the second substrate 3, forming the color filters 2 thereon, and forming the common electrode 4.

The color filter includes the three primary colors of red, green and blue. When light emitted from the backlight unit passes the color filter, only one of the three primary colors passes while the other remaining colors are absorbed. Thus, when light passes through the color filter, the color which has passed through the color filter excluding the absorbed colors are recognized by humans' eyes.

However, the problem of the color filter is that it allows only one of the R, G and B colors to pass therethrough, and absorbs the most portions of the white light, causing a loss of about two-thirds of the light emitted from the backlight unit by the color filter.

In addition, because light absorption also occurs from elements for forming the liquid crystal panel, namely, from the TFT or the liquid crystal layer itself, resulting in degradation of the overall light transmittance of the LCD and luminance.

Thus, in order to solve the problem, a brighter light source should be used, or a plurality of light sources should be used and a driving voltage of the light sources should be increased.

SUMMARY OF THE INVENTION

Therefore, in order to address the above matters the various features described herein have been conceived. One aspect of the exemplary embodiments is to provide a liquid crystal display (LCD) including a fluorescent color filter that absorbs ultraviolet rays to generate visible rays and an intra-cell polarizer formed on a first substrate, and its fabrication method.

Another aspect of the exemplary embodiments is to provide a low-cost highly-efficient LCD by lowering fabrication costs such that a fluorescent material is not coated within a CCFL and a light condensing film is not used.

This specification provides an LCD that includes: a first substrate and a second substrate; a liquid crystal layer between the first and the second substrates; and a fluorescent color filter responding to light over the first substrate, thereby the fluorescent color filter supplies the light to the liquid crystal layer.

This specification also provides a method for fabricating an LCD that includes: preparing first and second substrates; depositing fluorescent material over the first substrate to form a color filter, the fluorescent material emitting the visible light in responding to the ULTRAVIOLET rays; and forming a liquid crystal layer between the first and second substrates.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Exemplary embodiments may be better understood with reference to the drawings, but these examples are not intended to be of a limiting nature. Like numbered elements in the same or different drawings perform equivalent functions. When a specific feature, structure, or characteristic is described in connection with an example, it will be understood that one skilled in the art may effect such feature, structure, or characteristic in connection with other examples, whether or not explicitly stated herein.

In the present invention, a color filter may be formed by using a self-fluorescent material, the self-fluorescent material uses ultraviolet rays as excitation light to thus fabricate an LCD with high luminance. In this case, a polarizer may be provided within a cell. In particular, the LCD has a COT (Color filter On Transistor) structure.

Figure 1:
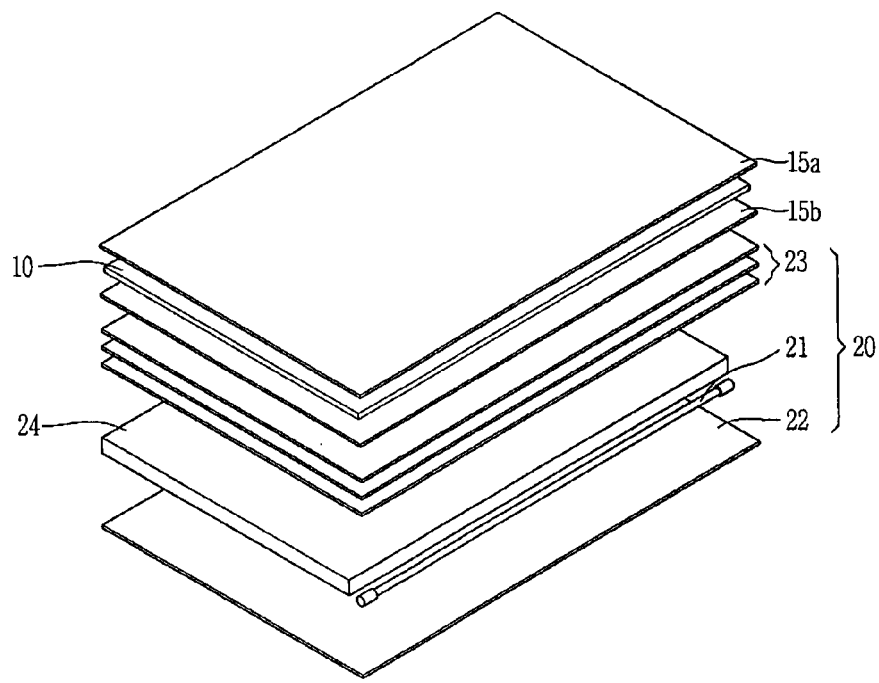
FIG. 1 is an exploded perspective view of a liquid crystal display (LCD) according to the related art.
Figure 2:
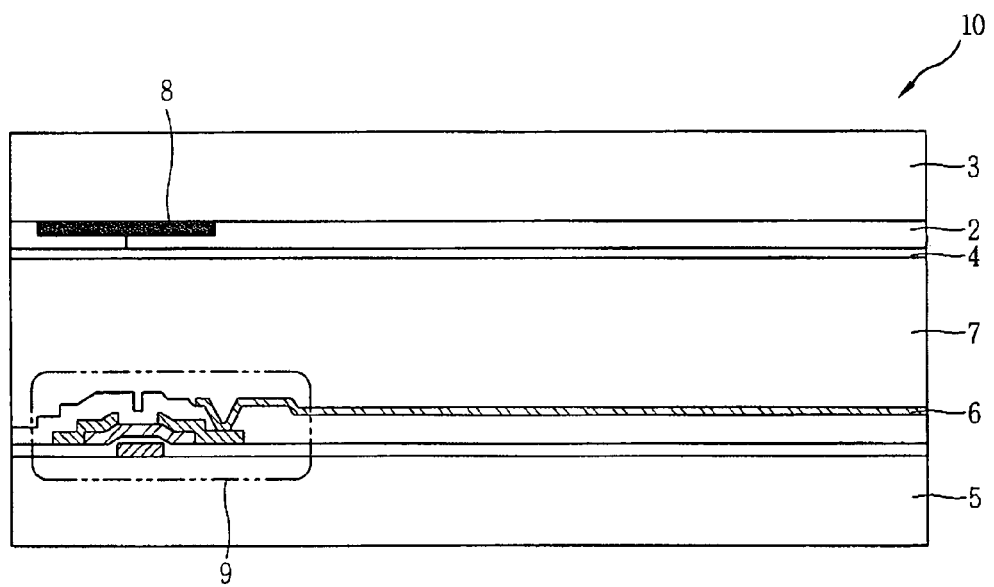
FIG. 2 is a sectional view showing a liquid crystal panel according to the related art.

In the exemplary embodiment of the present invention, the LCD includes a liquid crystal panel and a backlight unit (refer to FIG. 1). Description for the exemplary embodiment of the present invention will be focused on the characteristics outstandingly discriminated from the related art.

Figure 3:
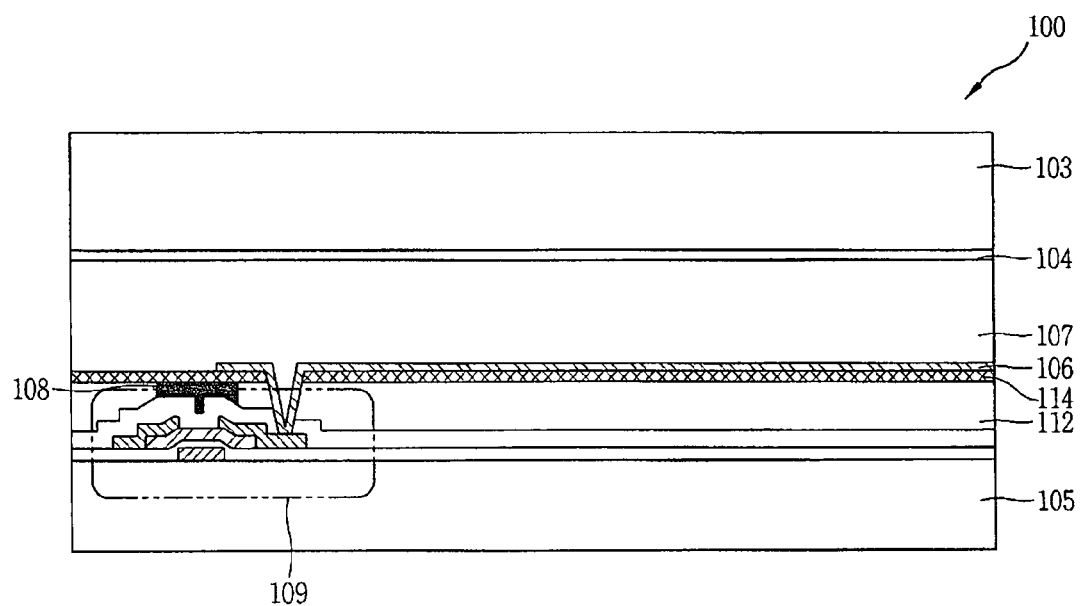
FIG. 3 is a sectional view showing an LCD according to an exemplary embodiment of the present invention.

FIG. 3 is a sectional view showing an LCD according to an embodiment the present invention.

As shown in FIG. 3, a liquid crystal panel 100 includes a first substrate 105, a second substrate 103, and a liquid crystal layer 107 formed between the first and second substrates 105 and 103.

A thin film transistor TFT 109 may be formed on the first substrate 105. A plurality of pixels may be formed on the first substrate and the TFT 109 may be formed at each pixel.

Unlike the related art, in the exemplary embodiment of the present invention, a color filter CF for implementing color may be formed at a pixel region of the first substrate. The color filter may be a fluorescent color filter 112 including a self-fluorescent material, which absorbs ultraviolet rays and emits visible rays. Herein, the self-fluorescent material that changes to a excited state by absorbing ultraviolet rays, and then is stabilized to its ground state by emitting visible rays. The visible rays may include at least one color of red(R), green(G) and blue(B) colors. The self-fluorescent material in the fluorescent color filter may be formed by using the same fluorescent material of CCFL.

A black matrix BM 108 may be formed on the first substrate in order to block unnecessary light. An intra-cell polarizer 114 for polarizing light which has passed through the fluorescent color filter 112 may be formed on the color filter and the BM 108.

A pixel electrode 106 may be formed on the intra-cell polarizer 114 over the first substrate 105. A common electrode 103 may be formed on the second substrate 105. An alignment film (not shown) for aligning liquid crystal molecules of the liquid crystal layer 107 may be coated on the pixel electrode 106 and the common electrode 104 in order to determine orientation of the liquid crystal molecules.

The first and second substrates 105 and 103 are attached with the liquid crystal layer 107 interposed therebetween. The liquid crystal layer 107 is driven by the TFTs formed on the first substrate 105, and the intensity of radiation of light that transmits through the liquid crystal layer is controlled to thus display information.

Unlike the related art color filter that simply absorbs the light emitted from the light source of the backlight unit and outputs only a particular wavelength, the fluorescent color filter 112 may be formed to have a material that absorbs ultraviolet rays and directly excites a fluorescent reaction to emit visible rays. Thus, light emitted from the light source may be changed to visible rays without a loss by the fluorescent color filter 112 and passes through the liquid crystal panel 100.

Because the fluorescent color filter 112 emits visible rays in every direction, light may be outputted in different directions as well as in the direction of the front surface of the liquid crystal panel 100. However, because the fluorescent color filter 112 itself may emit the visible rays, although light may be outputted in the different directions, the luminance can be increased by more than about 50%, compared with the related art color filter.

In the general LCD, there occurs a light loss when light emitted from the light source transmits through the liquid crystal panel. Namely, the light is absorbed or diffused by various factors such as the substrate itself, the BM, the TFTs, etc., as well as the color filter. Comparatively, however, because the fluorescent color filter 112 may be used as the color filter to considerably increase the luminance to thus compensate the reduced luminance and allow the LCD have high luminance.

Meanwhile, the liquid crystal layer 107 of the liquid crystal panel 100 is very weak to ultraviolet rays, so if the liquid crystal layer 107 is exposed to ultraviolet rays, it can be damaged. Because the damage of the liquid crystal layer 107 causes a defective LCD, it is necessary for the liquid crystal layer 107 not to be exposed.

Thus, according to an exemplary embodiment of the present invention, the fluorescent color filter 112 may provided at a lower side of the liquid crystal layer, so that the fluorescent color filter 112 can prevent ultraviolet rays from reaching the liquid crystal layer 107 and change the ultraviolet rays into visible rays and provide visible rays to the liquid crystal layer.

For these reasons, in the present invention, the fluorescent color filter 112 may be formed on the TFT substrate, namely, over the first substrate 105, of the liquid crystal panel 100.

Differently, if the fluorescent color filter 112 is formed between a light source (not shown) and the first substrate 105, a color would be mixed with an adjacent pixel due to a parallax phenomenon of light.

Figure 4A:
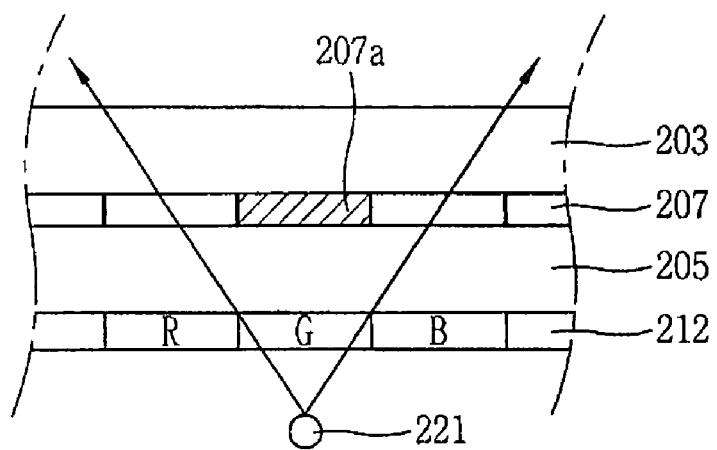
FIGS. 4a and 4b are conceptual views showing a parallax due to a light source according to a position of a color filter.
Figure 4B:
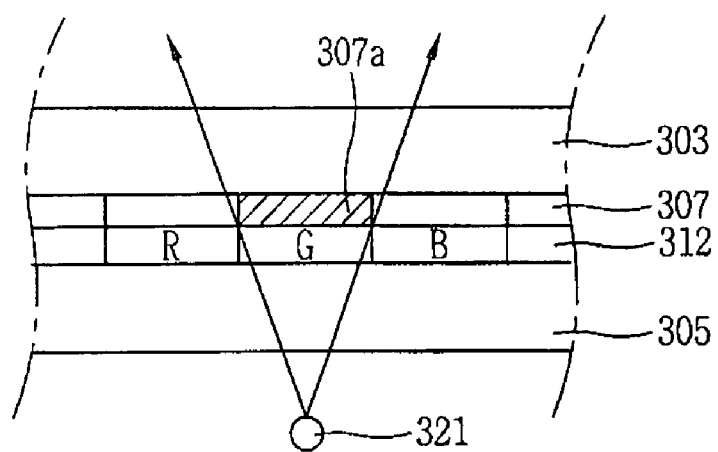

FIGS. 4a and 4b are conceptual views showing a parallax due to a light source according to a position of a color filter. FIG. 4a is a sectional view showing that a fluorescent color filter 212 is formed at a lower portion of the first substrate 205, and FIG. 4b is a sectional view showing that a fluorescent color filter 312 is formed between a first substrate 305 and a liquid crystal layer 307. The fluorescent color filters 212 and 312 are represented by three colors of R, G and B.

As shown in FIG. 4a, when the color filter 212 is formed under the first substrate 205, because the first substrate 205 is much thicker than the liquid crystal layer 207, light coming from a color filter (R) of a particular pixel not only passes through the liquid crystal layer 207a of the pixel region, but also passes through other regions. Therefore, the light coming form a color filter (R) could be mixed with those coming from adjacent color filter (G) or (B), such that the mixed light causes defect.

However, as shown in FIG. 4b, when the color filter 312 is formed at the upper portion of the first substrate 305 close to the liquid crystal layer 307, namely beneath the liquid crystal layer 307, light coming from the color filter can transmit only through the liquid crystal layer 307a, and thus, the parallax can be considerably reduced. (Reference numerals 203, 303, 221 and 321 denote the second substrate and a light source.)

Thus, in an embodiment of the present invention, the fluorescent color filter may be formed between the first substrate and the liquid crystal layer.

In an embodiment of the present invention, a light source that emits ultraviolet rays may be used in the LCD, because the fluorescent color filter absorbs ultraviolet rays and emits visible rays. In this case, as the light source for supplying ultraviolet rays to the liquid crystal panel, any other light source can be used so long as it can generate ultraviolet rays. For example, ultraviolet light lamp can be used, which includes a glass tube; a pair of electrodes at the both sides of the glass tube; and emitting material for emitting the ultraviolet light in the glass tube. But because the general CCFL having fluorescent materials generates a white light, not the ultraviolet rays, so, the light source the same to CCFL except a fluorescent material therein can be used.

In an embodiment of the present invention, the intra-cell polarizer is provided.

In the general LCD, a transmission light emitting from the light source includes an undesired vibration vector, so in order to control the vibration vector of the transmission light, the polarizers are attached on both surfaces of the liquid crystal panel such that the transmission axis of each polarizer cross at 90° with respect to each other.

Light which has passed through liquid crystal with the polarizers attached thereon is polarized as light with a particular vibration vector. Thus, while the light passes through the liquid crystal panel, intensity of the transmission light is controlled according to a rotation degree of the polarization axis to thus express colors from black to white.

In an embodiment of the present invention, the fluorescent color filter between the two substrates have the characteristics that it absorbs ultraviolet rays and emits visible rays, so the light emitted from the fluorescent color filter is a non-polarized light, causing a problem that the non-polarized light coming from the fluorescent color filter is directly provided to the liquid crystal layer.

Thus, with reference to FIG. 3, in an exemplary embodiment of the present invention, the intra-cell polarizer 114 is provided on the fluorescent color filter 112 to polarize light coming from the fluorescent color filter 112. In this case, the intra-cell polarizer 114 may be made of a material that can polarize light.

The present invention includes a method for fabricating the LCD having the fluorescent color filter and the intra-cell polarizer.

The method for fabricating the LCD according to an embodiment of the present invention will now be described.

First, the first and second substrates are prepared, and gate lines and data lines that define pixel regions are formed to cross each other on the first substrate.

Next, a TFT including a gate electrode, an active layer, a source electrode and a drain electrode is formed at each crossing of the gate lines and the data lines.

Thereafter, the fluorescent color filter may be formed at the pixel region by depositing self-fluorescent material over the first substrate to form a color filter. The self-fluorescent material emits the visible rays in responding to the ultraviolet rays.

And then, the intra-cell polarizer is formed on the fluorescent color filter, and a pixel electrode that electrically contacts with the drain electrode may be formed at the pixel region.

A common electrode may be formed on the second substrate and a liquid crystal layer may be formed between the first and second substrates to fabricate the liquid crystal panel.

The liquid crystal panel may be assembled together with a backlight unit to complete the LCD.

In this case, the intra-cell polarizer may be formed by coating or printing process.

A material used for forming the intra-cell polarizer may be a polymer material with viscosity, and the intra-cell polarizer may be formed by coating or printing the material with viscosity like the method for forming photoresist.

As so far described, the LCD and its fabrication according to an embodiment of the present invention have many advantages.

That is, first, the light efficiency and luminance of the LCD can be improved compared with the related art LCD.

Second, because the fluorescent material does not need to be coated within the CCFL in the backlight unit, the fabrication cost of the CCFL can be reduced.

In addition, because the fluorescent color filter is used, the luminance of the liquid crystal panel can be increased and a condensing film can be omitted.

Although the exemplary embodiments of the invention have been disclosed for illustrative purposes, those skilled in the art will appreciate that various modifications, additions and substitutions are possible, without departing from the scope and spirit of the invention as disclosed in the accompanying claims.

For example, in the present invention, the edge type LCD having the light source provided at one side of the liquid crystal panel has been described, but without being limited thereto, the embodiment of the invention can be applicable to various other types of LCDs including the direct type LCD.

In addition, the fluorescent color filter and the intra-cell polarizer may have the COT (Color filter On Transistor) structure as being formed on the first substrate. However, the fluorescent color filter is not limited to be formed only at the upper portion of the TFTs but can be formed between the first substrate and the TFTs as necessary.

In this case, the fluorescent color filter and the intra-cell polarizer can be sequentially provided on the first substrate, TFT can be formed on the substrate with the fluorescent color filter and the intra-cell polarizer formed thereon, the first substrate can be attached with the second substrate, and then, the liquid crystal layer can be formed.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device, comprising:
   a first substrate and a second substrate;
   gate lines and data lines being perpendicular to the gate lines on the first substrate to define a plurality of pixel regions;
   a thin film transistor at each pixel region, the pixel region including a gate electrode on the first substrate, agate insulating layer on the gate electrode, a semiconductor layer on the gate insulating layer, and a source electrode and a drain electrode on the semiconductor layer;
   a passivation layer over the first substrate having the thin film transistors;
   a fluorescent color filter responding to a first light to emit a second light, wherein the fluorescent color filter is on the passivation layer of the first substrate;
   an intra-cell polarizer on the fluorescent color filter;
   a black matrix on the passivation layer over the thin film transistors;
   a pixel electrode over the fluorescent color filter; and
   a liquid crystal layer between the first and the second substrates,.
   wherein the whole area of the black matrix on the passivation layer is disposed over a part of the semiconductor layer and the black matrix is directly contacted with the intra-cell polarizer.

2. The device of claim 1, further comprising:
   a light source providing ultraviolet rays to the liquid crystal layer.

3. The device of claim 2, wherein the light source includes a ultraviolet light lamp.

4. The device of claim 3, wherein the ultraviolet light lamp includes:
   a glass tube;
   a pair of electrodes at the both sides of the glass tube; and
   emitting material for emitting the ultraviolet light in the glass tube.

5. The device of claim 1. wherein the fluorescent color filter includes a material absorbing ultraviolet rays and emitting visible rays.

6. The device of claim 5, wherein the visible rays includes at least one color of red, green and blue colors.

7. The device of claim 1, wherein the fluorescent color filter is within the pixel region.

8. A method for fabricating a liquid crystal display device comprising:
   preparing first and second substrates;
   forming gate lines and data lines crossing each other on the first substrate to define a plurality of pixel regions;
   forming a thin film transistor at each pixel region;
   forming a passivation layer over the first substrate to cover the thin film transistor;
   depositing a self-fluorescent material on the passivation layer of the first substrate to form a fluorescent color filter, the self-fluorescent material emitting visible light in responding to ultraviolet rays;
   forming a black matrix on the passivation layer over the thin film transistors;
   forming an intra-cell polarizer on the fluorescent color filter; and
   forming a liquid crystal layer between the first and second substrates,
   wherein the whole area of the black matrix on the passivation layer is disposed over a part of the semiconductor layer and the black matrix is directly contacted with the intra-cell polarizer.

9. The method of claim 8, wherein forming the thin film transistor comprises:
   forming a gate electrode, an active layer, a source electrode and a drain electrode at each crossing of the gate lines and data lines.

10. The method of claim 8, wherein the intra-cell polarizer is formed by coating or printing process.

* * * * *